(12) United States Patent
Wagner

(10) Patent No.: US 11,738,791 B2
(45) Date of Patent: Aug. 29, 2023

(54) EQUIPMENT TRANSPORTATION CART

(71) Applicant: William Wagner, Salinas, CA (US)

(72) Inventor: William Wagner, Salinas, CA (US)

( * ) Notice: Subject to any disclaimer, the term of this patent is extended or adjusted under 35 U.S.C. 154(b) by 102 days.

(21) Appl. No.: 17/575,518

(22) Filed: Jan. 13, 2022

(65) Prior Publication Data

US 2022/0266886 A1    Aug. 25, 2022

Related U.S. Application Data

(60) Provisional application No. 63/152,185, filed on Feb. 22, 2021.

(51) Int. Cl.
| | |
|---|---|
| *B62B 3/02* | (2006.01) |
| *B62B 5/00* | (2006.01) |
| *B62B 3/04* | (2006.01) |
| *B62B 3/12* | (2006.01) |

(52) U.S. Cl.
CPC .............. *B62B 5/0079* (2013.01); *B62B 3/02* (2013.01); *B62B 3/04* (2013.01); *B62B 3/12* (2013.01)

(58) Field of Classification Search
CPC ........... B62B 5/0079; B62B 3/02; B62B 3/04; B62B 3/12; B62B 1/18; B62B 1/20; B62B 1/22
See application file for complete search history.

(56) References Cited

U.S. PATENT DOCUMENTS

| | | | | |
|---|---|---|---|---|
| 1,446,799 | A * | 2/1923 | Hunziker | B62B 3/04 280/47.34 |
| 2,967,627 | A * | 1/1961 | Vinson | B62B 3/02 254/2 R |
| 3,913,762 | A * | 10/1975 | Alexander | B62B 5/04 D34/24 |
| 4,435,115 | A * | 3/1984 | Orstad | A22B 7/006 280/654 |
| 4,861,057 | A * | 8/1989 | Kunkle | F16B 7/0493 280/47.131 |
| 5,330,212 | A * | 7/1994 | Gardner | B62B 1/20 280/47.24 |
| 5,620,193 | A * | 4/1997 | Dschaak | B62B 1/22 280/47.31 |
| 6,168,174 | B1 * | 1/2001 | MacDougall | B62B 3/12 280/DIG. 6 |
| 6,364,596 | B1 * | 4/2002 | Spencer | B62B 1/18 280/47.23 |

(Continued)

*Primary Examiner* — Erez Gurari
(74) *Attorney, Agent, or Firm* — Donald R. Boys; Central Coast Patent Agency LLC

(57) ABSTRACT

A cart has a rectangular forward and rear frame structures both pivoted on a common axle carrying two wheels, lengthwise pieces joining side pieces of the frame structures on both sides, implementing triangular sides for the cart and forming an upper plane, other lengthwise pieces joining a cross pieces of the frame structures to form a support plane parallel to and lesser in width than the upper plane, a central two-inch square metal tubing joined below the forward frame structure from the axle structure to beyond an upper extent of the forward frame structure, a yoke assembly with a single front wheel; and a handle structure joined to the rear frame structure at an upper cross piece. The first and second lengthwise pieces serve as sides to restrain cargo loaded in the cart on the support plane formed by the third and fourth lengthwise pieces.

10 Claims, 3 Drawing Sheets

(56) References Cited

U.S. PATENT DOCUMENTS

| | | | | |
|---|---|---|---|---|
| 6,416,077 B1* | 7/2002 | Chen | ............ | B62B 7/08 |
| | | | | 280/47.38 |
| 8,123,238 B1* | 2/2012 | Burgess | ............ | B60D 1/01 |
| | | | | 280/47.131 |
| 9,986,731 B2* | 6/2018 | Mitchell | ............ | B62B 3/002 |
| 10,654,503 B1* | 5/2020 | Carlson | ............ | B62B 1/12 |
| 11,198,459 B1* | 12/2021 | Dudley | ............ | B62B 1/12 |
| 11,254,341 B2* | 2/2022 | Carlson | ............ | B62B 3/02 |
| 2003/0102654 A1* | 6/2003 | Shapiro | ............ | B62B 7/10 |
| | | | | 280/650 |
| 2004/0084864 A1* | 5/2004 | Casey | ............ | B62B 5/0438 |
| | | | | 280/47.31 |
| 2009/0309329 A1* | 12/2009 | Davison | ............ | B60S 13/00 |
| | | | | 280/418 |
| 2012/0000718 A1* | 1/2012 | Berrett | ............ | A61G 1/0287 |
| | | | | 384/129 |
| 2017/0101121 A1* | 4/2017 | Gwennap | ............ | B62B 3/02 |
| 2017/0297596 A1* | 10/2017 | Ertel | ............ | B62B 1/208 |
| 2017/0325445 A1* | 11/2017 | Mitchell | ............ | A01M 31/006 |
| 2021/0086813 A1* | 3/2021 | Yifrah | ............ | B62B 3/008 |
| 2021/0284221 A1* | 9/2021 | Perez | ............ | B62B 5/0046 |

\* cited by examiner

EQUIPMENT TRANSPORTATION CART

CROSS-REFERENCE TO RELATED APPLICATIONS

The instant application claims priority to provisional application 62/152,185, filed Feb. 22, 2021. All disclosure of the parent application is incorporated at least by reference.

BACKGROUND OF THE INVENTION

1. Field of the Invention

The instant invention is in the technical area of transport apparatus and pertains more particularly to a cart adapted for transporting equipment such as hunting or fishing gear in remote and rugged terrain.

2. Description of Related Art

There is known to exist in the art different sorts and styles of carts for transporting equipment and other baggage in remote areas over rough terrain. The challenge in all such apparatus is the fact of rough terrain, and carts in the existing art have drawbacks, such as difficulty in handling during use.

What is needed is a cart that may be easily transported to an area of use, may be easily deployed, and is relatively easy to load, unload, and maneuver in use.

BRIEF SUMMARY OF THE INVENTION

In one embodiment of the invention a cart is provided, comprising a rectangular rear frame structure having opposite side pieces and cross pieces joined together rigidly, a rectangular forward frame structure having also opposite side pieces and cross pieces joined together rigidly, a first lengthwise piece joining side pieces of the forward and the rear frame structures on one side, a second lengthwise piece joining side pieces of the forward and the rear frame structures on an opposite side, the first and second lengthwise pieces implementing triangular sides for the cart and forming an upper plane, a third and a fourth lengthwise piece joining a cross piece of the forward frame structure to a cross piece of the rear frame structure such that the third and fourth lengthwise pieces form a support plane parallel to and lesser in width than the plane formed by the first and the second lengthwise pieces, an axle structure joining the vertices of the triangular sides across a width of the cart, a set of wheels joined to the axle structure on each side of the cart at the vertices of the triangular sides, a central two-inch square metal tubing joined below the forward frame structure from the axle structure to beyond an upper extent of the forward frame structure, a yoke assembly removably mounted to the central metal tubing forward of the forward frame structure, with a single front wheel mounted in the yoke assembly, and a handle structure joined to the rear frame structure at an upper cross piece. The first and second lengthwise pieces serve as sides to restrain cargo loaded in the cart on the support plane formed by the third and fourth lengthwise pieces.

In one embodiment the cart further comprises expanded metal panels spanning between different pairs of pieces of the frame, the expanded metal panels forming side areas and bottom areas, positioned to retain cargo placed in the cart. Also, in one embodiment the first and second lengthwise pieces form an upper rim for the cart, and the upper rim of the cart and the rectangular support structure below the upper rim are sized such that a jet sled may be loaded and carried within the upper rim resting on the rectangular support structure. In one embodiment the side pieces and cross pieces and lengthwise pieces are all three-quarter inch square steel or aluminum tubing. And in one embodiment the cart further comprises mechanisms adapted to allow extension of the handle above an upper rim.

In one embodiment the cart further comprises carrier hooks joined to the first and second lengthwise pieces, adapted to carry lengthy cargo in a cradle fashion outside the sides of the cart. Also, in one embodiment the cart further comprises tie-down hooks joined to the first and second lengthwise pieces, facilitating anchoring cords for securing cargo in the cart. Also, in one embodiment the cart is a foldable cart with the first and the second lengthwise pieces joined to the side pieces of the rear frame structure by removable pins, the third and fourth lengthwise pieces joined to the cross piece of the rear frame structure also by removable pins, and the rear and the forward frame structures are adapted to pivot at the vertices of the sides around the axle structure, such that by removing the removable pins the lengthwise pieces are released to lie parallel to the forward frame structure, and the rear frame structure pivots to lie flat on the forward frame structure, reducing the cart to a substantially flat, folded structure supported on the three wheels of the cart. In one embodiment the cart is carried by a hitch receiver of a vehicle with the extended end of the two-inch square steel tubing inserted in the hitch receiver and secured by a pin through the hitch receiver and a hole through the two-inch square steel tubing proximate the open end. And in one embodiment the carat is folded and placed in either a cargo region of a SUV or a bed of a truck for transport or storage.

DETAILED DESCRIPTION OF THE INVENTION

Figure 1:
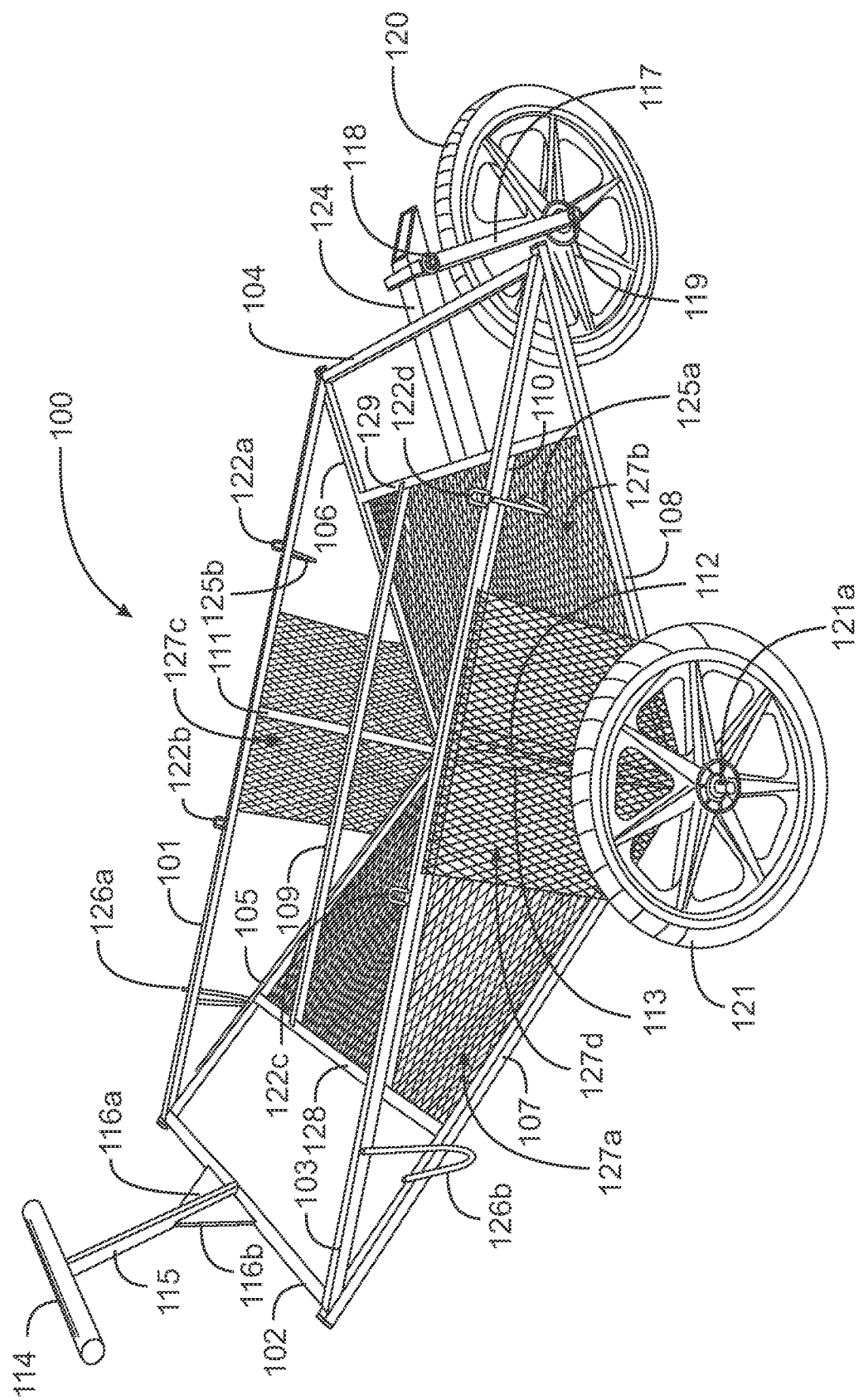
FIG. 1 is a perspective view of a cart in an embodiment of the invention.

FIG. 1 is a perspective view of a cart in an embodiment of the invention. The cart in this example comprises a welded frame of three-quarter inch square steel tubing. The tubing in another embodiment may be of another material, for example aluminum to make cart of lighter weight. Then use of three-quarter inch tubing is not a limitation as carts in other embodiments may use tubing of different sizes. In some embodiments the tubing used may be, for example, one-inch square tubing. Further, the use of square tubing is not a limitation either, as tubing of other shapes may be used.

Referring back to FIG. 1, two pieces of tubing 101 and 103 of equal length are welded to two shorter pieces of tubing 102 and 104 in a rectangular pattern to form an upper rim of the cart in this example. From each corner of the rectangular upper rim on one side two pieces of tubing 105 and 106 are each welded to corners of the upper rim at an angle with the opposite ends of the two pieces welded together, forming a first triangular side structure. On the other side of the upper rim two pieces of tubing 107 and 108 are each welded to opposite corners of the upper rim at an angle with the opposite ends of the two pieces welded together, forming a second triangular side structure. A piece of tubing 111 is welded vertically as a reinforcing member from a midpoint of tubing 101 to the apex of the triangle formed by pieces 105 and 106, and a piece of tubing 112 is welded vertically as a reinforcing member from a midpoint of tubing 103 to the apex of the triangle formed by pieces 107 and 108.

In this example a cross piece 128 is welded between pieces 105 and 106 as shown, and a cross piece 129 is welded between pieces 106 and 108, as shown, for structural reinforcement. Two lengthwise reinforcing tubing pieces are welded between pieces 128 and 129 as shown, forming a rectangular frame smaller than the rectangular upper rim at about one-half of the height of the frame. A bottom cross piece of tubing 113 is welded across the width of the structure between the apexes of the triangular side structures across the width of the cart. The structure of welded tubing described above provides a solid, strong but lightweight framework for the cart in one embodiment of the invention.

In this example a sheet of expanded metal sheet 127*a* is welded to the rectangular structure formed by pieces 105, 107, 128 and 113, and a similar piece of expanded metal sheet 127*b* is welded between pieces 106, 108, 129 and 113. A sheet of expanded metal 127*c* is welded to the triangular side structure formed by pieces 101, 105 and 106, and a similar piece of expanded metal sheet 127*d* is welded to the triangular side structure formed by pieces 103, 107 and 108, as shown. Sheet 127*c* may also be welded to upright piece 111 and sheet 127*d* may also be welded to upright piece 112. These sheets provide a lightweight bottom and sides for the framework, such that cargo placed into the cart may be retained.

In the instant example the expanded metal sheets cover only specific portions of the bottom and side areas, but in other embodiments the bottom area and the side areas may be completely covered.

In this example a length of steel tubing 124 is welded centrally under sheet 127*b* and welded at one end to bottom cross piece 113, to cross piece 129 and to cross piece 104 of the upper rim. and extends forward some distance beyond cross piece 104. Square steel tubing 124 is larger and heavier than the tubing used for the framework, and in one embodiment is two-inch square steel tubing, which happens to be a size used by many trailer hitch receivers on automobiles and trucks. The extension beyond cross piece 104 may be cut at an angle as shown or cut square to the length of piece 124.

Near the extended end of tubing 124 a cross hole is provided for a mounting rod 118 which is used in this example to anchor a downwardly extending yoke assembly 117 for an axle 119 onto which a front wheel 120 is mounted. Mounting rod 118 in this example is held in place by a cotter key, and may be easily and quickly removed, removing also yoke assembly 117 and front wheel 120.

In this example an axle 121*a* is provided extending to each side of the frame from bottom cross piece 113. This may be one axle that spans the frame, or it may be two separate axles, one extending from each side of bottom cross piece 113. The extension of the axle on each side carries a wheel 121. In FIG. 1 only one wheel on the near side is illustrated, but it is urges that a second wheel is also present on the opposite side of the frame. The second wheel is not shown in FIG. 1 simply to avoid unnecessary confusion in the complexity of the drawing. The cart is carried on the two wheels 121, one on each side of the frame.

Wheels 120 and 121 in this example are molded polymer wheels with hard robber on the rims. This one example, as wheels in other embodiments may be of different material and construction and may also be inflatable in some embodiments. On an end of the frame opposite the single front wheel a member 115 is welded to cross piece 102 and reinforced by welded elements 116*a* and 116*b*. A handle 114 is welded at an end of member 115 away from the frame of the cart. The length angle, in this example, of member 115 with the plane of the upper rim places the handle at a convenient height above the upper rim of the cart for a user to grasp and maneuver the cart. In some embodiments the length of member 115 and the angle with the plane of the upper rim may be adjustable, such that the placement of the handle may be made convenient for different users.

In this example four U-shaped members 122*a*, 122*b*, 122*c* and 122*d* are welded to tubings 101 and 103 in a rectangular pattern, as shown. These members provide anchor points for tie-down cords and such as bungee cords that may be used to hold cargo in place in the cart. These may also serve to anchor hooks on lines that may be used to lift the cart in some circumstances.

In this example side carrier hooks 125*a*, 125*b*, 126*a* and 126*b* are welded to tubing 101 and 103 as show, with two carrier hooks on each side of the upper rim of the frame. Two hooks on one side may be used to carry lengthy items, such as fishing rods or other sorts of poles that may be wanted at such as campsites.

Figure 2:
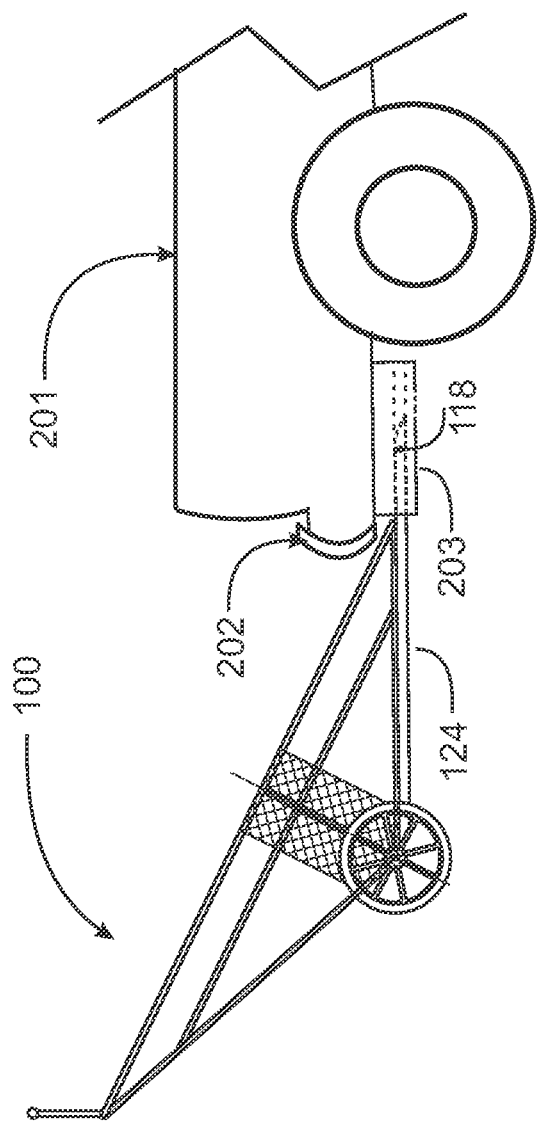
FIG. 2 is a perspective view of a cart with wheels removed, engaged to a carrier at a rear of a pickup truck.

FIG. 2 is a side illustration of cart 100 with yoke assembly 117 and front wheel 120 removed, with two-inch tubing member 124 inserted into and anchored in a hitch receiver 131 of a vehicle 130. Cart 100 may be carried this way from a user's home or other establishment to a point of use in a perhaps wilderness environment. The removed front yoke and wheel may be carries in a truck bed or other place in the vehicle. Once arrived at a point of use, the cart is removed from the hitch receiver and the front yoke and wheel reassembles, and the cart is ready for use.

Referring again to FIG. 1 in use one removes the cart at a point of use by pulling the anchor pin and removing the cart from the hitch receiver of the vehicle that was used to bring the cart and gear to a point of use. A motivation for the inventor to invent this unique cart was waterfowl hunting, such as for ducks and geese. Gear for hunting waterfowl may be considerable and difficult to transport manually from a parking area to a position on a lake or other environment where waterfowl might congregate. The cart in embodiments of the invention solves the transport problem.

The user may choose to remount the front yoke assembly 117 and front wheel 120. The front wheel allows for releasing the cart to stand on the three wheels. But the front wheel is not essential in use, and the user may elect to operate without remounting the front wheel.

The user may load all sorts of gear in the body of the cart such as camping gear, cooking gear, food and beverages, and anything else that the user may deem useful. In one embodiment, as illustrated in FIG. 1, members 109 and 110, providing a secondary rectangular rim below the upper rectangular rim, are sized such that a jet sled may be loaded and carried within the upper rim resting on the secondary rectangular rim, with room left beneath the jet sled for carrying other cargo. U-shaped members 122*a*, 122*b*, 122*c* and 122*d* welded to the upper rim provide tie-down hooks for anchoring cords or rope securing cargo in the sled. The side carrier hooks 125*a*, 125*b*, 126*a* and 126*b* are useful in many circumstances for fishing rods or for carry rifles or shotguns.

Once loaded the user grasps handle 114, which is welded to one end of the upper rim and may tilt the cart back and balance the cart on the two side wheels under the middle region of the cart. The user simply walks forward pushing the cart. The side wheels 121 are relatively large in diameter to avoid being trapped by rocks, debris and other artifacts of rough terrain. Further there may be a choice of wheel sizes and tire characteristics for different sorts of terrain. Further still, in one embodiment the height of the handle and the angle from the upper rim may be adjustable.

Figure 3:
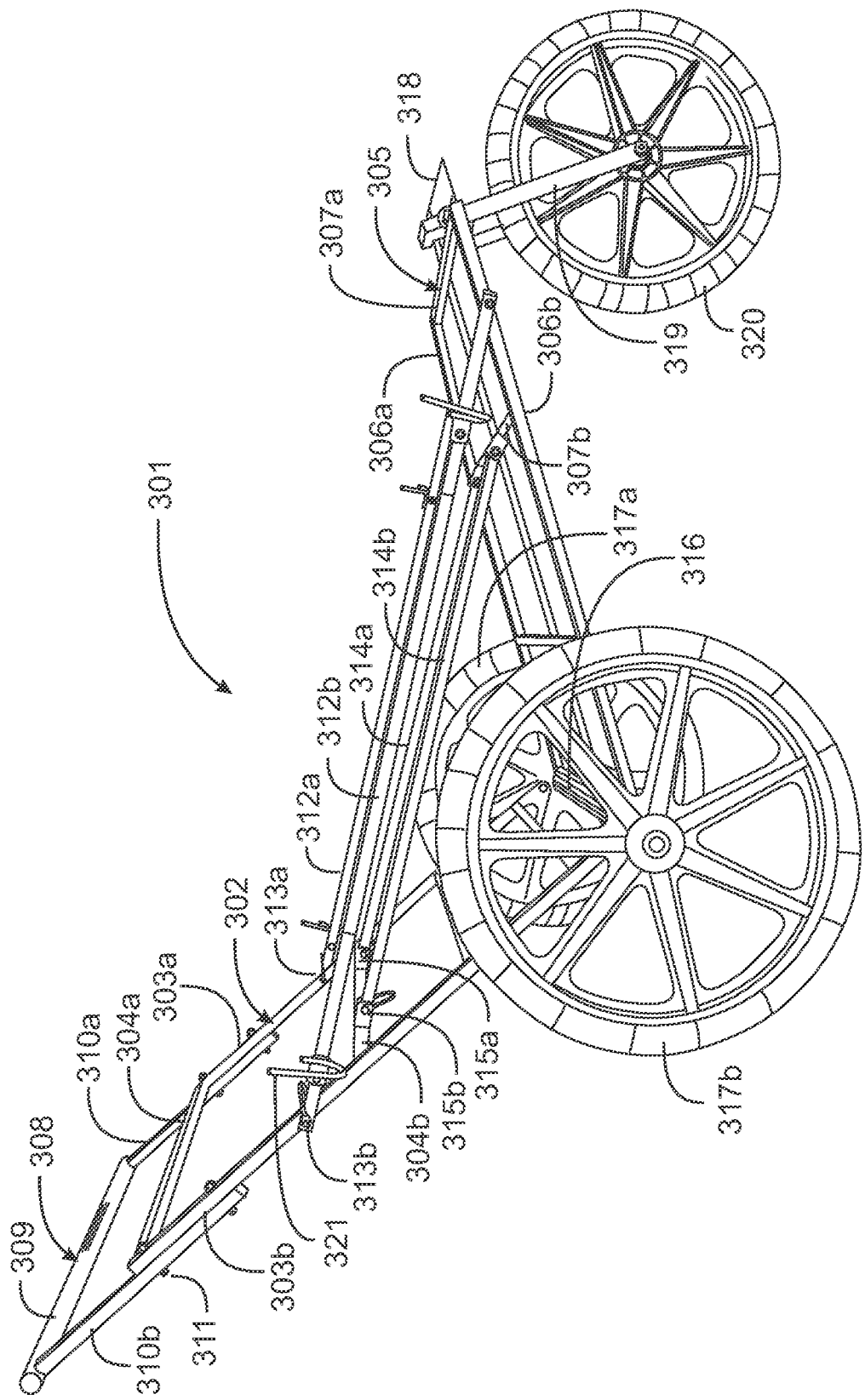
FIG. 3 is a perspective view of a cart in an alternative embodiment of the invention.

FIG. 3 is a perspective view of a cart 301 in an alternative embodiment of the invention, made to fold to be compatible with storage and transport in such as a SUV or bed of a truck. Cart 301 is similar in many ways to cart 100 of FIG. 1 but differs in several structural details. Firstly, cart 301 does not have expanded metal sheets added to the bottom and sides as does cart 100.

Cart 301 has an axle structure 316 supporting two large wheels 317*a* and 317*b* which may be the same wheels as wheels 121 on cart 100. Just as in cart 100 cart 301 is operated in some circumstances with load supported just on the two wheels on each side of the cart. Cart 301 also, like cart 100, has a central, forward projecting steel tubing 318, which may be the same two-inch square tubing utilized in cart 100. A removable front wheel 320 is mounted in a yoke assembly 319 which may be the same yoke assembly as element 117 of cart 100. With yoke 319 with wheel 320 removed cart 301 may be adapted to be carried in a hitch receiver of a vehicle.

Cart 301 has a first rear rectangular frame structure 302, comprising sides 303*a* and 303*b*, and cross pieces 304*a* and 304*b*, which is adapted to pivot on axle structure 316. Cart 301 has a second forward rectangular frame structure 305, comprising sides 306*a* and 306*b*, and cross pieces 307*a* and 307*b*, which also is adapted to pivot on axle structure 316. steel tubing 318 is welded to an underside of structure 305.

In a fully deployed state frame structures 302 and 305 are connected by two sets of lengthwise tube elements, a first set comprising tube elements 312*a* and 312*b*. Element 312*a* is joined to side piece 303*a* by a removable pin 313*a* and is joined to side piece 306*a* of forward frame structure 305 by a pivot joint. Similarly, element 312*b* is joined to side piece 303*b* of rear frame structure 302 by a removable pin 313*b*, and is joined to side piece 306*b* of forward frame structure 305 by a pivot joint.

A second set of lengthwise tube elements comprises elements 314*a* and 314*b*. Lengthwise element 314*a* is joined to cross piece 304*b* by a removable pin 315*a* in a bracket and is joined to cross piece 307*b* of forward frame structure 305 by a pivot pin also in a bracket extending from the cross piece. Similarly lengthwise element 314*b* is joined to cross piece 304*b* by a removable pin 315*b* in a forward extending bracket, and is joined on the opposite end to cross piece 307*b* of forward frame structure 305 by a pivot pin in a bracket.

Lengthwise elements 312*a* and 312*b* form upper sides of cart 301, and lengthwise elements 314*a* and 314*b* form a lower support plane within the cart upon which cargo may be placed, restrained on the sides by elements 312*a* and 312*b*.

A handle structure 308 having a round handle 309 and side pieces 310*a* and 310*b* is bolted to rear frame structure 302 by conventional bolt and nut fasteners 311, of which just one is labeled. In an alternative embodiment the handle structure may be adjustable to extend further upward from the frame structure.

Cart 301, like cart 100 may be used with or without the front wheel and may be joined for transport to a hitch receiver of as vehicle. Cart 301 also has side carrier hooks such as element 321 the same as side carrier hooks described above for cart 100.

Unlike cart 100, cart 301 may be folded for storage or for transport. To fold cart 301 a user removes yoke assemble 319 with wheel 320, and pulls all four removable pins 313*a*, 313*b*, 315*a* and 315*b*. This action releases rear frame structure 302 from forward frame structure 305 such that the frame structures may be folded together around the axle structure 316 with the lengthwise elements 312*a*, 312*b*, 314*a* and 314*b* lying flat on forward frame structure 305.

The carts in embodiments of the invention are not limited to waterfowl hunting but are useful for any sort of outdoor sport that may be practiced in remote and rugged terrain, such as many sorts of hunting and fishing excursions.

A person with ordinary skill in the art will understand that the embodiments depicted in the figures and described in the specification are entirely exemplary and are not limiting to the scope of the invention, as the invention may be accomplished with different means of construction, different mountings for wheels, in many different sizes and shapes other than those specifically included here as examples of the invention. The scope of the invention is limited only by the claims.

I claim:

1. A cart, comprising:
   a rectangular rear frame structure having opposite side pieces and cross pieces joined together rigidly;
   a rectangular forward frame structure having also opposite side pieces and cross pieces joined together rigidly;
   a first lengthwise piece joining side pieces of the forward and the rear frame structures on one side;
   a second lengthwise piece joining side pieces of the forward and the rear frame structures on an opposite side, the first and second lengthwise pieces implementing triangular sides for the cart and forming an upper plane;
   a third and a fourth lengthwise piece joining a cross piece of the forward frame structure to a cross piece of the rear frame structure such that the third and fourth lengthwise pieces form a support plane parallel to and lesser in width than the plane formed by the first and the second lengthwise pieces;
   an axle structure joining the vertices of the triangular sides across a width of the cart;
   a set of wheels joined to the axle structure on each side of the cart at the vertices of the triangular sides;
   a central two-inch square metal tubing joined below the forward frame structure from the axle structure to beyond an upper extent of the forward frame structure;
   a yoke assembly removably mounted to the central metal tubing forward of the forward frame structure, with a single front wheel mounted in the yoke assembly; and
   a handle structure joined to the rear frame structure at an upper cross piece;
   wherein the first and second lengthwise pieces serve as sides to restrain cargo loaded in the cart on the support plane formed by the third and fourth lengthwise pieces.

2. The cart of claim 1 further comprising expanded metal panels spanning between different pairs of pieces of the frame, the expanded metal panels forming side areas and bottom areas, positioned to retain cargo placed in the cart.

3. The cart of claim 1 wherein first and second lengthwise pieces form an upper rim for the cart, and the upper rim of the cart and the rectangular support structure below the upper rim are sized such that a jet sled may be loaded and carried within the upper rim resting on the rectangular support structure.

4. The cart of claim 1 wherein the side pieces and cross pieces and lengthwise pieces are all three-quarter inch square steel or aluminum tubing.

5. The cart of claim 1 further comprising mechanisms adapted to allow extension of the handle above an upper rim.

6. The cart of claim 1 further comprising carrier hooks joined to the first and second lengthwise pieces, adapted to carry lengthy cargo in a cradle fashion outside the sides of the cart.

7. The cart of claim 1 further comprising tie-down hooks joined to the first and second lengthwise pieces, facilitating anchoring cords for securing cargo in the cart.

8. The cart of claim 1 wherein the cart is a foldable cart with the first and the second lengthwise pieces joined to the side pieces of the rear frame structure by removable pins, the third and fourth lengthwise pieces joined to the cross piece of the rear frame structure also by removable pins, and the rear and the forward frame structures are adapted to pivot at the vertices of the sides around the axle structure, such that by removing the removable pins the lengthwise pieces are released to lie parallel to the forward frame structure, and the rear frame structure pivots to lie flat on the forward frame structure, reducing the cart to a substantially flat, folded structure supported on the three wheels of the cart.

9. The cart of claim 1 carried by a hitch receiver of a vehicle with the extended end of the two-inch square steel tubing inserted in the hitch receiver and secured by a pin through the hitch receiver and a hole through the two-inch square steel tubing proximate the open end.

10. The cart of claim 8 folded and placed in either a cargo region of a SUV or a bed of a truck for transport or storage.

\* \* \* \* \*